United States Patent [19]

Sullivan et al.

[11] Patent Number: 4,764,388

[45] Date of Patent: Aug. 16, 1988

[54] METHOD FOR MAKING VITAMIN ENRICHED CEREAL

[75] Inventors: Spencer W. Sullivan, Wyckoff; Marsha K. Verrico, Fair Lawn, both of N.J.

[73] Assignee: Nabisco Brands, Inc., Parsippany, N.J.

[21] Appl. No.: 695,061

[22] Filed: Jan. 25, 1985

[51] Int. Cl.$^4$ .............................................. A23L 1/29
[52] U.S. Cl. .................................. 426/311; 426/452; 426/549; 426/620
[58] Field of Search ............... 426/549, 619, 620, 464, 426/72, 73, 311, 648, 452, 496, 289, 295, 296, 275

[56] References Cited

U.S. PATENT DOCUMENTS

| | | | |
|---|---|---|---|
| B 493,950 | 3/1976 | Borenstein et al. | |
| 1,575,762 | 3/1926 | Hoffman et al. | |
| 2,013,003 | 9/1935 | Loose | 426/620 |
| 2,282,788 | 3/1942 | Musher | 426/72 |
| 2,345,571 | 4/1944 | Briod et al. | |
| 2,497,035 | 2/1950 | Seeder | |
| 2,693,419 | 11/1954 | Gager | 426/473 |
| 2,712,499 | 7/1955 | La Pierre | 426/72 |
| 2,775,521 | 12/1956 | Mateles et al. | |
| 2,801,176 | 7/1957 | Ozai-Durrani | |
| 3,366,485 | 1/1968 | Moen et al. | 426/275 |
| 3,753,732 | 8/1973 | Boroshok | 426/72 |
| 3,767,824 | 10/1973 | Keyser et al. | |
| 3,784,716 | 1/1974 | Spangler | 426/289 |
| 3,992,556 | 11/1976 | Kovacs | 426/620 |
| 4,004,035 | 1/1977 | Hirzel et al. | |
| 4,478,857 | 10/1984 | Stauss | |

FOREIGN PATENT DOCUMENTS

| | | |
|---|---|---|
| 674046 | 12/1960 | Canada . |
| 2309136 | 9/1973 | Fed. Rep. of Germany . |
| 2301546 | 6/1974 | Fed. Rep. of Germany . |
| 1327350 | 8/1973 | United Kingdom . |
| 1328608 | 8/1973 | United Kingdom . |
| 1437501 | 5/1976 | United Kingdom . |
| 2020160 | 11/1979 | United Kingdom . |
| 2120522 | 12/1983 | United Kingdom ................. 426/73 |

OTHER PUBLICATIONS

Sir Stanley Davidson et al. "Human Nutrition and Dietetics" Churchill Livingston, 1972, 5th Edition, pp. 211-213.

Food Technology, vol. 30, No. 4, Apr. 1976, pp. 52-66; W. M. Cort et al.: "Nutrient Stability of Fortified Cereal Products".

*Primary Examiner*—Donald E. Czaja
*Assistant Examiner*—Carolyn Paden
*Attorney, Agent, or Firm*—Richard Kornutik

[57] ABSTRACT

This invention is a method for distributing a dry, multi-vitamin premix into a cereal grain which is, used for making a milled cereal product. In the preferred embodiment the milled cereal product is shredded wheat. The product of the method is also included in this invention.

16 Claims, No Drawings

METHOD FOR MAKING VITAMIN ENRICHED CEREAL

BACKGROUND OF THE INVENTION

1. Field of the Invention

This invention relates to vitamin enriched cereals and methods for producing them. More specifically, this invention relates to a vitamin enriched milled cereal made by a method wherein a dry vitamin premix is distributed into the cereal ingredients before shredding.

2. Description of the Prior Art

Breakfast cereal products are often enriched with vitamins. In methods for making milled cereals, vitamins are generally sprayed onto the cereal pieces formed during milling after they are baked. In order to accomplish this a multi-vitamin premix, which can be a dry composition, is mixed into a solution and sprayed onto the cereal pieces. Spraying the multi-vitamin solution onto the cereal pieces after baking of the cereal pieces prevents heat labile vitamins from degradation during the baking process. Vitamin degradation from cooking steps is particularly undesirable because of the formation of distasteful odors and flavors as well as the loss of heat labile vitamin activity. The topical application of a vitamin solution is undesirable because yellow stains appear on the surface of the cereal pieces. Topically applied vitamins can cause an undesirable flavor for the cereal piece. Additionally, when the vitamins dry and remain on the surface area of the cereal pieces, the vitamin are in direct contact with the cereal consumer's tongue. Where cereal products such as shredded cereal products have a high surface area, the amount of vitamins which come into contact with the consumer's tongue during consumption is increased. Applying a frosting to the cereal pieces after the vitamin solution has been sprayed onto the cereal pieces is helpful in masking the flavor of the vitamins, but this process can also dilute the vitamin content present upon the cereal pieces.

U.S. Pat. No. 3,767,824 to Keyser et al. discloses a method of coating cereal products with vitamins. This process requires that a cereal grain be precooked, dried, and formed into particles. The cereal particles are then coated with vitamins. The vitamins are prepared in a fatty composition before their application to the cereal particles. This patent states that the addition of vitamins to a cereal dough is old and undesirable. The reason stated for the undesirability of premixing vitamins into a cereal dough is that the vitamins are deactivated during the cooking step. The Hoffman La Roche vitamin premix discussed in this patent is typical of a dry multi-vitamin premix used for fortifying cereals and other grain products.

U.S. Pat. No. 2,345,571 to Briod et al. discloses processes for producing a vitamin fortified, dry product. The processes according to this invention require that a fat soluble vitamin composition be added to an aqueous slurry of a vegetable material. The examples in this patent indicate that the fat soluble vitamin composition is a liquid, oleaginous mixture. The vitamin composition is not added to the vegetable material in a dry powder form.

U.S. Pat. No. 1,575,762 to Hoffman et al. discloses a method of adding dry vitamins, in this case B vitamins, to a bread dough. This method requires devitalizing a yeast and then drying the yeast without rupturing cell walls. The resulting product is added to another food product to supplement its vitamin content. This reference is only concerned with vitamins contained in yeast and not dry powder vitamin mixtures. Additionally, this patent is only concerned with enriching the vitamin B content in foods.

U.S. Pat. No. 2,775,521 to Mateles et al. discloses a method for fortifying grain products with dry mixtures of vitamins and minerals. This patent is concerned with coating the grain product with a vitamin coating. The product of this patent is subject to the same problems of undesirable flavor and color variations due to the topical coating of the vitamin on the food product. This patent does not diclose a method for incorporating or distributing the vitamin into the cereal grain mass of the food product.

U.S. Pat. No. 2,497,035 to Seeder discloses a process of preparing a vitamin C enriched baked product. The method of this patent involves adding either dry or wet ascorbic acid to a dough which is then baked. This patent is unconcerned with preparing a cereal product or a product enriched by any vitamins other than vitamin C.

U.S. published patent application Ser. No. B493,950 to Borenstein et al. discloses a composition in which dry vitamin A in powder form is added to a flour. The flour can then be used to prepare baked goods. This patent is unconcerned with the enriching of a cereal product with a dry multi-vitamin mixture.

It is an object of this invention to provide a method of incorporating or distributing a dry multi-vitamin premix into a cereal grain mass before that cereal grain is milled and formed into cereal pieces. This invention includes the product of the method of producing cereal pieces having dry vitamins incorporated into them. This object is achieved without sacrificing activity of the multi-vitamins and produces a multi-vitamin enriched milled cereal product without an adverse effect on the flavor or appearance of the cereal product by the incorporated or distributed multi-vitamins.

SUMMARY OF THE INVENTION

The method for multi-vitamin enriching a milled cereal according to this invention involves steps of cooking a cereal grain optionally followed by tempering the cooked cereal grain. After cooking or tempering, the cooked cereal grain is placed in a screw conveyor and the adding of a dry multi-vitamin premix to the tempered cereal grain with simultaneous mixing occurs. The multi-vitamin premix and cereal grain are mixed together such that the dry multi-vitamin premix is dispersed or distributed homogeneously throughout the cereal grain composition. The resulting multi-vitamin enriched, cereal grain composition is fed or dropped into a hopper which in turn feeds the multi-vitamin and cereal grain composition into milling rolls. During milling the composition is transformed alternatively into (1) shredded strings or a crushed, shredded sheet or (2) flaked particles. When shredding the shredded strings or sheet is then overlapped or laminated. The laminated, shredded strings or sheet is formed or cut into cereal pieces and undergoes baking or toasting. The cereal pieces are optionally conveyed to a cooling apparatus and after cooling are further transported to a packaging apparatus.

The dry multi-vitamin premix, according to this invention, can be any commercially available multi-vitamin premix. Most preferably, the vitamin premix is high in B vitamins as well as other fat and water soluble vitamins. A suitable dry multi-vitamin premix is of a fine particulate matter such that its distribution into the cereal grain mass is facilitated and occurs without lumping or large particles appearing in the final cereal product.

The composition of dry multi-vitamin particulate matter incorporated into the dough of the cereal pieces made according to the above method is included within this invention.

DETAILED DESCRIPTION OF THE INVENTION

The process according to this invention requires the cooking of a cereal grain, which in the preferred embodiment is wheat. The cooked cereal grain is optionally allowed to temper. After cooking or tempering the cereal grain is fed or dropped into a screw conveyor and mixed. In the screw conveyor the cereal grain is mixed with a dry multi-vitamin premix. The dry multi-vitamin premix and the cereal grain mass is blended such that the multi-vitamin premix is homogeneously distributed throughout the cereal grain. The resulting composition is fed or dropped into a hopper, which supplies milling rolls. The multi-vitamin and cereal grain composition is then milled alternatively into shreds or flakes and, when shredded, the resulting shredded strings or sheet can be overlapped or laminated. The overlapped shreds are then scored, baked, and broken into cereal pieces or alternatively cut and formed into cereal pieces and then baked. The cereal pieces can then be cooled and packed.

The cooking of the cereal grain according to this invention can be done in any standard cooking equipment. The cereal grain must be cooked at temperatures and humidities which hydrate and gelatinize the internal structure of the cereal grain particles. Typically, such temperatures are between about 190° F. and about 212° F. During cooking, moisture tends to collect on the cereal grain particles. This moisture can increase the stickiness of the cooked cereal grain and can cause handling problems when the cereal grain is transferred to the other apparatuses involved in this method. Mixing the cereal grain in the cooking vat at about 8.5 revolutions per minute provides for even cooking and reduces lumping.

Typically milled cereals are made from any cereal grains and starch containing vegetables including those which are members selected from the group consisting of wheat, oats, rice, potatoes, corn, barley, rye, sorghum, and mixtures of these. In the preferred embodiment whole grain soft wheat is the cereal grain used. Wheat suitable for use in this invention can be purchased from many suppliers. Cooking of the wheat grain in the preferred embodiment occurs at 210° F. at atmospheric pressure for approximately 30 minutes for a 3000 pound batch. This cooking time includes a "come-up time" of between 6.5 to about 8 minutes during which the temperature of the cereal grain in the vat is being elevated from ambient temperature to the cooking temperature. Similar cooking parameters are used with the othr grains and grain mixtures.

The cooked cereal grain is then drained, cooled, and optionally allowed to temper. Tempering allows the hydrated, gelatinized cereal grain to sit for a sufficient amount of time to permit complete water hydration of the cereal grain particles. This water migration solubilizes the starches deposited in the cereal grain.

Tempering times can vary greatly. The most desirable tempering times for cereal grains are between approximately 2 hours to approximately 36 hours. Most preferably, tempering times are between about 6 hours to between about 24 hours. Tempering times above approximately 36 hours can result in excess compaction of the cereal grain mass. Compaction results from the cereal grains being stored in large volumes for too long a period within the tempering vessel. Compaction results in "chunks" forming within the cereal grain mass. Such chunks can clog the feed hoppers and subsequently the shredding rollers used in this method. A Fitzmill can be used to reduce chunks to particle size when they are formed. Excessive tempering times can also result in undesirable heat build-up as well as odors due to microbiological activity.

After cooking and tempering the cereal grain mass is transferred from the tempering vessel by a suitable means such as a conveyor belt to a hopper which feeds a standard screw conveyor. An example of such a screw conveyor is that made by the Screw Conveyor Corporation, 704 Hoffman Street, Hammond, Ind. 46327. A dry multi-vitamin premix is added with simultaneous mixing to the cereal grain mass at the entry of the screw conveyor to form a homogeneous composition.

Dry multi-vitamin premixes suitable for use with this invention are supplied by the Hoffman La Roche Company. Premixes from other manufacturers are available and can be made to numerous specifications. Suitable vitamin concentrations can vary widely. Usually, the practice in the cereal manufacturing industry is to add a premix with a multi-vitamin concentration of approximately 2 to 4 times the actual "Recommended Daily Allowance" or RDA to meet shelf stability requirements. This is because as much as 75 percent of the multi-vitamin concentration in cereals can be lost to degradation during normal shelf life periods. It has been found that this invention retains between about 60 to about 85 percent of its initial multi-vitamin concentration. This results in a significant economic savings by decreasing the amount of multi-vitamin overages required during manufacturing.

Typical ranges for multi-vitamins used in this invention are listed in Table I.

TABLE I

| VITAMIN | CONCENTRATION RANGE FOR 25 mg OF PREMIX |
|---|---|
| A | 2100–2110 USPU |
| D | 58–62 USPU |
| Niacinamide | 5.5–6.0 mg |
| Iron | 1.9–2.0 mg |
| Zinc | 1.5–1.7 mg |
| Pyridoxine HCl ($B_6$) | 0.7–0.8 mg |
| Riboflavin ($B_2$) | 0.5–0.55 mg |
| Thiamine HCl ($B_1$) | 0.5–0.55 mg |
| Folic acid | 0.1–0.15 mg |
| Cyanocobalamin ($B_{12}$) | 2.2–2.3 mcg |

Diluent in sufficient quantity for the premix to total 25 grams.

A typical dry, multi-vitamin premix for use with this invention can contain the vitamins as listed in Table II.

TABLE II

| VITAMIN | CONCENTRATION FOR 25 mg OF PREMIX |
|---|---|
| A | 2100 USPU |
| D | 6D USPU |
| Niacinamide | 6 mg |

TABLE II-continued

| VITAMIN | CONCENTRATION FOR 25 mg OF PREMIX |
|---|---|
| Iron | 2 mg |
| Zinc | 1.5 mg |
| Pryidoxine HCl ($B_6$) | 0.7 mg |
| Riboflavin ($B_2$) | 0.5 mg |
| Thiamine HCl ($B_1$) | 0.5 mg |
| Folic acid | 0.13 mg |
| Cyanocobalamin ($B_{12}$) | 2.2 mcg |

Diluent in sufficient quantity for the premix to total 25 grams.

Other vitamins such as Vitamin E and Biotin and minerals such as calcium, copper, magnesium, and phosphorous can be included in the dry multi-vitamin premix. For purposes of this invention the term "dry multi-vitamin premix" can include a multi-vitamin mixture with minerals. This patent is not limited by the vitamin or mineral content or concentration of the premix.

The amount of total diluent selected in the above tables can be varied to suit the equipment used to perform the method. The vitamin concentrations can be altered to meet a desired vitamin concentration for a serving unit of the final cereal product. Typically, a serving unit is 1 ounce by weight of the baked, shredded cereal pieces. Any non-toxic, therapeutically effective vitamin concentration is acceptable for use with this invention. U.S. Government standards for vitamin levels as established by the Food and Drug Administration are useful in selecting a desired vitamin concentration for a serving unit of a shredded cereal product made according to this invention.

The multi-vitamin premix particulate matter must not be permitted to form lumps before being mixed into the cereal grain mass. This can be accomplished by feeding the dry vitamin premix into the screw conveyor by any gravimetrie or volumetric feeder. Such feeders are manufactured by the K-Tron, Accrison, or other companies. Desirable feeders rotate the premix during the feed operation. The rotation of the premix breaks up the powder and prevents lumping. Such feeders are a suitable means for adding a dry multi-vitamin premix to a cereal grain mass.

The feeding of the multi-vitamin premix to the grain cereal mass is desirably done at a steady flow rate. In desirable embodiments of the invention a multi-vitamin premix is presented in Table II is fed to the tempered cereal grain mass at a flow rate of between approximately 20 and approximately 30 grams of premix to between approximately 125 and approximately 140 pounds of tempered cereal grain mass having between about 30 and about 55 percent moisture content. The preferred embodiment of the invention method uses a flow rate of 25 mg of a dry, multi-vitamin premix to 135 pounds of the tempered cereal grain mass. This flow rate yields a cereal product having a desirable level of vitamin fortification per serving unit. Similar flow rates are used with other grains such as oats, rice, potatoes, corn, barley, rye, sorghum, or mixtures of these.

The apparatus or means for adding the dry multi-vitamin premix to the cereal grain mass must provide a flow rate of premix sufficient to enrich the cereal grain mass to a selected vitamin content. The flow rate must be altered to account for the moisture content and density differences between cereal grains so that the final baked product has an acceptable vitamin concentration. The amount of diluent or other inert ingredients in a multi-vitamin premix can effect the vitamin flow rate. A multi-vitamin premix can be custom ordered from most vitamin manufacturers so as to contain a diluent vitamin concentration suitable for the flow characteristics of an apparatus or means for adding the dry multi-vitamin premix to a cereal grain. The operational speeds of a means for adding the dry multi-vitamin premix and the screw conveyor can be altered to control the vitamin concentration being mixed into the cereal grain mass.

Mixing within the screw conveyor continues until the dry multi-vitamin particulate matter is uniformly and homogenously distributed or dispersed throughout the cereal grain mass. The temperature of the cereal grain mass within the screw conveyor is generally between about 74° F. and 78° F. or approximately ambient temperature. The B vitamins listed in Table II are considered to be heat labile vitamins. Vitamin C cannot be added at this stage because the subsequent oven temperatures of the baking step destroys it. From the screw mixer the mixed vitamin and cereal grain composition is conveyed or fed to hoppers which in turn feed a series of conventional milling rolls.

Any conventional milling system can be used to conduct this invented method. A conventional milling system for use in the preferred embodiment of the invented process to make a shredded cereal can comprise a pair of closely spaced rolls that rotate in opposite directions with at least one of the rolls having circumferential grooves. Upon passing between the rolls, the multi-vitamin and cereal grain composition is formed into long individual strings. A circumferentially grooved roll can also be grooved transversely to the circumferential grooves for the production of a net-like sheet. When sheets are formed, the sheets are comprised of interwoven shreds or strings. When the rolls are held tightly together, the shreds or filaments partially separate from each other, but are more or less connected. When the rolls are sprung slightly apart under pressure, the adjacent filaments can be united to each other by very thin webs or fins which stretch between them. Conventional shredding systems which can be used in the process of the present invention are disclosed in U.S. Pat. Nos. 502,378; 2,008,024; 2,013,003; 2,693;419; 4,004,035; and Canadian Pat. No. 674,046. Also, for purposes of this invention the term shredded sheet refers to both shredded strings and net-like shredded sheets.

Shredding mills are typically arranged in a linear series along a common conveyor with the shreds running longitudinally or parallel to the direction of movement of the conveyor. The sheets or layers of the filaments can be overlapped or laminated on a conveyor. A typical biscuit can contain from 1 to about 6 individual shred layers or filaments. In desirable embodiments 8 to 12 shred layers are laminated together.

Upon obtaining the requisite thickness, the multi-layer web can be cut transversely and longitudinally into multiple lines of biscuits by conventional equipment. Examples of suitable cutters include those with two cutting wheels in which one cutting wheel cuts the shred layers longitudinally and the other cutting wheel cuts the shred layers transversely. Some cuting mechanisms have one wheel which cuts in both directions. The cutting of the laminated, shredded sheet can be completely through the laminate to form the individual biscuit shapes for cereal pieces prior to baking. Alternatively, cutting can be partially through the laminate such that it is scored to form biscuit shapes which after baking are broken, either mechanically or by hand, into distinct cereal pieces.

Baking of the milled cereal pieces occurs in conveyor dryers, vacuum dryers, or other commercial baking equipment. For purposes of this invention the term, baking, includes "toasting". The cereal pieces are baked between about 400° F. and about 600° F. for about 3 to 10 minutes or until a moisture content of approximately 2 to 5 percent is obtained. A moisture content over 8 percent destroys water soluble vitamins. After baking the cereal pieces can optionally be cooled to below 100° F. The cereal pieces are then ready for packaging and consumption. The cereal particles resulting from this method do not contain yellow streaks or other discoloration which is typically found on cereal particles which have had vitamins applied onto their surfaces. Vitamin C and other heat labile vitamins can optionally be sprayed onto the cereal pieces after baking. Vitamin C does not have an unpleasant flavor as do the B vitamins, therefore, its topical application is acceptable to consumers.

The method of vitamin fortification of milled cereal according to this invention allows for cereal grains to be cooked in batches and the milling operation to be conducted in a continuous manner. This allows for efficient cost effective cereal production. This invention can also be used with filled shredded cereals wherein the filling is a dried fruit or other flavorant. This invention is further understood from the following examples.

EXAMPLE I

This example produces a multi-vitamin enriched shredded wheat product. The vitamins are those listed in Table II above. The formula and procedure for the making this embodiment which is the preferred embodiment are below:

TABLE III

| INGREDIENTS | AMOUNTS |
|---|---|
| Wheat | 3000 pounds |
| Vitamin premix* | 1200 grams |
| Water (180° F.) | 500 gallons |

*Vitamin content and concentrations are the same as detailed in Table II.

The wheat is placed into a cooking vat with the hot water and cooked to a temperature of 210° F. for 30 minutes with mixing. Following cooking the cereal grain mass is drained and cooled to ambient temperature by a Rex-Nord dryer. This dryer or means for cooling blows 40° F. air across the conveyed portion of the cereal grain mass for between 8 to 10 minutes. The cereal grain mass is then allowed to temper for 8 hours and obtains an average moisture content of 45 percent. Following tempering the cereal grain mass is conveyed to a screw conveyor and mixed with the dry multi-vitamin premix until a homogeneous composition is obtained. The dry multi-vitamin premix is injected into the cereal grain mass near the entry point of the cereal grain mass into the screw conveyor by a K-Tron feeder. The injection of the multi-vitamin premix is at a flow rate of 25 mg of premix per 135 pounds of tempered wheat passing through the screw conveyor. The multi-vitamin premix and cereal grain composition is then dropped from the screw conveyor into a series of feed hoppers which supply the shredding rolls. Shredded sheets of the multi-vitamin premix and cereal grain composition are formed into three laminae on a conveyor belt. The laminae are transported to a cutter which scores the laminated, shredded sheet into cereal particles of 0.9 inches in length and by 0.8 inches in width. The average depth of the cereal particles are 0.2 inches. The scored, shredded sheet is then conveyed to an oven and dried at 500° F. for between 5 to 7 minutes or until an average moisture content of between about 2 to about 3.5 percent. The baked, shredded sheet is then cooled to below 100° F. and mechanically broken into distinct cereal pieces. The pieces are then packaged.

EXAMPLE II AND III

These Examples use the same method as detailed in Example I except that 3000 pounds of either oats or potatoes can be cooked and subsequently enriched with the adding of the dry multi-vitamin premix into the selected, tempered cereal grain mass. The adding of the multi-vitamin premix is at the same flow rate of Example I. The concentration of vitamins in the final cereal pieces can vary slightly from the cereal pieces of Example I because of the variations that these cereal grains have in hydration and density from wheat after tempering. Regardless of this difference, the resultant multi-vitamin concentration in the fortified cereal pieces is at safe levels.

EXAMPLE IV

This Example uses the same method and formula as detailed in Example I except that (1) there is no tempering step, (2) the milling system forms flaked ceral pieces, and (3) the cereal pieces or flakes are toasted at 575° F. to caramelize their surface to form a rich brown coating.

EXAMPLE V

This Example uses the same method and formula as detailed in Example IV except that after toasting the cereal pieces are cooled to 75° F. and sprayed with a Vitamin C solution.

We claim:

1. A method for multi-vitamin enriching a milled cereal, comprising:
    (a) cooking a cereal grain at temperatures and humidities which hydrate and gelatinize cereal grain internal structure to form a gelatinized, wet cereal grain mass and subsequently;
    (b) adding a dry multi-vitamin premix into said cooked cereal grain mass with sufficient simultaneous mixing to form a homogeneous multi-vitamin premix and cereal grain composition and then;
    (c) milling said multi-vitamin premix and cereal grain composition, wherein milled cereal pieces are formed; and
    (d) baking said milled cereal pieces.

2. The method according to claim 1 wherein said cereal grain is a member selected from the group consisting of wheat, oats, rice, corn, barley, rye, sorghum, and mixtures of these.

3. The method according to claim 2 wherein said cereal grain is wheat and said cereal grain mass has a moisture content of between about 30 and about 55 percent by weight.

4. The method according to claim 1 wherein said adding is by a means for feeding powder at a flow rate sufficient to enrich a serving unit of said cereal pieces with an effective amount of said dry multi-vitamin premix.

5. The method according to claim 4 wherein said dry multi-vitamin premix consists essentially of Vitamin A in a concentration between about 2100 and about 2110 USPU, vitamin D in a concentration between about 58 and about 62 USPU, Niacinamide in a concentration between about 5.5 and about 6.0 mg, Iron in a concentration between about 1.9 and about 2.0 mg, Zinc in a concentration between about 1.5 and about 1.7 mg, Pyridoxine HCl in a concentration between about 0.7 and about 0.8 mg, Riboflavin ($B_2$) in a concentration between about 0.5 and about 0.55 mg, Thiamine HCl ($B_1$) in a concentration between about 0.5 and about 0.55 mg, Folic acid in a concentration between about 0.1 and about 0.15 mg, and Cyanocobalamin ($B_{12}$) in a concentration between about 2.2 and about 2.3 mcg.

6. A method for multi-vitamin enriching a milled cereal, comprising:
    (a) cooking a cereal grain;
    (b) tempering said cooked cereal grain at temperatures and humidities which hydrate and gelatinize cereal grain internal structure to form a gelatinized, cereal grain mass and subsequently;
    (c) adding a dry multi-vitamin premix by a means for feeding powder at a steady flow rate into said cooked cereal grain mass with sufficient simultaneous mixing to form a homogeneous dry multi-vitamin premix and cereal grain composition, said steady flow rate being a rate of between about 20 mg and about 30 mg of dry multi-vitamin premix for between approximately 125 and approximately 140 pounds of cereal grain mass and then;
    (d) milling said dry multi-vitamin premix and cereal grain composition wherein milled cereal particles are formed; and
    (e) baking said milled cereal pieces.

7. The method according to claim 6 wherein said cereal grain is a member selected from the group consisting of wheat, oats, rice, corn, barley, rye, sorghum, and mixtures of these.

8. The method according to claim 7 wherein said cereal grain mass has a moisture content of between about 30 and about 55 percent by weight.

9. The method according to claim 6 wherein said adding of said dry multi-vitamin premix into said cereal grain mass is by a means for feeding powder at a steady flow rate sufficient to enrich a serving unit of said cereal pieces with an effective amount of said dry multi-vitamins.

10. The method according to claim 9 wherein said dry multi-vitamin premix contains Vitamin A in a concentration between about 2100 and about 2110 USPU, Vitamin D in a concentration between about 58 and about 62 USPU, Niacinamide in a concentration between about 5.5 and about 6.0 mg, Iron in a concentration between about 1.9 and about 2.0 mg, Zinc in a concentration between about 1.5 and about 1.7 mg, Pyridoxine HCl in a concentration between about 0.7 and about 0.8 mg, Riboflavin ($B_2$) in a concentration between about 0.5 and about 0.55 mg, Thiamine HCl ($B_1$) in a concentration between about 0.5 and about 0.55 mg, Folic acid in a concentration between about 0.1 and about 0.15, and Cyanocobalamin ($B_{12}$) in a concentration between about 2.2 and about 2.3 mcg.

11. A method for multi-vitamin enriching a shredded cereal, said method includes:
    (a) cooking wheat and tempering said wheat at temperatures and humidities which hydrate and gelatinize cereal grain internal structure to form a hydrated, gelatinized wheat mass;
    (b) shredding said wheat mass into a shredded sheet and forming laminae of said shredded sheet; and
    (c) baking said laminated, shredded sheet and forming cereal pieces of said laminated, shredded sheet;
wherein the improvement comprises adding a dry multi-vitamin premix with simultaneous mixing into said hydrated, gelatinized wheat mass, thereby distributing said dry, multi-vitamin premix into the cereal grain mass of said cereal pieces.

12. The method according to claim 11, wherein said adding of said dry multi-vitamin premix is by a means for feeding powder at a steady flow rate.

13. The method according to claim 12 wherein said hydrated, gelatinized wheat mass has a moisture content of between about 30 and about 55 percent by weight.

14. The method according to claim 13 wherein said steady flow rate is sufficient to enrich a serving unit of said cereal pieces with a therapeutically effective amount of said dry multi-vitamin premix.

15. The method according to claim 14 wherein said dry multi-vitamin premix contains Vitamin A in a concentration between about 2100 and about 2110 USPU, Vitamin D in a concentration between about 58 and about 62 USPU, Niacinamide in concentration between about 5.5 and about 6.0 mg, Iron in a concentration between about 1.9 and about 2.0 mg, Zinc in a concentration between about 1.5 and about 1.7 mg, Pyridoxine HCl in a concentration between about 0.7 and about 0.8 mg, Riboflavin ($B_2$) in a concentration between about 0.5 and about 0.55 mg, Thiamine HCl ($B_1$) in a concentration between about 0.5 and about 0.55 mg, Folic acid in a concentration between about 0.1 and about 0.15, and Cyanocobalamin ($B_{12}$) in a concentration between about 2.2 and about 2.3 mcg.

16. The method of claim 11 wherein said shredded wheat cereal contains a filling comprising fruit.

* * * * *